Dec. 24, 1940.   W. H. BASELT   2,226,507
FREIGHT CAR BRAKE
Filed May 11, 1938   3 Sheets-Sheet 2

INVENTOR.
Walter H. Baselt
BY
ATTORNEY.

Dec. 24, 1940.  W. H. BASELT  2,226,507
FREIGHT CAR BRAKE
Filed May 11, 1938  3 Sheets-Sheet 3
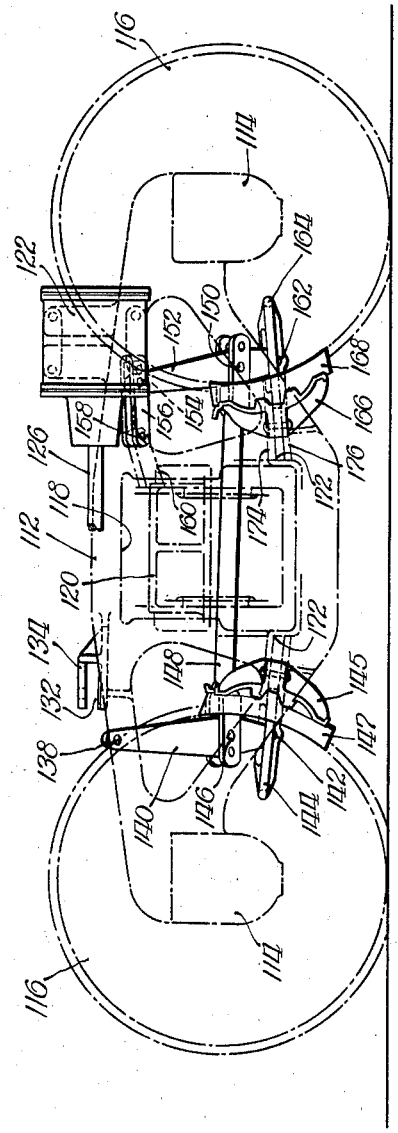
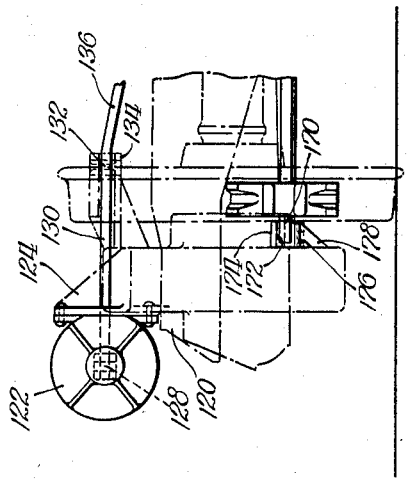
INVENTOR.
Walter H. Baselt
BY
ATTORNEY.

Patented Dec. 24, 1940

2,226,507

UNITED STATES PATENT OFFICE 2,226,507

FREIGHT CAR BRAKE

Walter H. Baselt, Chicago, Ill., assignor to American Steel Foundries, Chicago, Ill., a corporation of New Jersey Application May 11, 1938, Serial No. 207,262

10 Claims. (Cl. 188—52)

My invention relates to brake rigging for a railway freight car truck and is directed more particularly to the most usual type of such freight car truck which comprises spaced side frames connected by a bolster or load carrying member.

Under modern conditions standards have been set up for such truck structures which strictly limit the space assigned to the various parts thereof. For example wheel centers may be fixed, rail clearances, side frame height with relation to the height of the center bearing of the bolster or load carrying member, and furthermore, clearances are required between the truck structure and the car body as well as between both of these and platforms or other possible structures along the right-of-way.

I have designed a practical brake arrangement for such trucks which is capable of meeing the above mentioned conditions while, at the same time, permitting the mounting of the power means on the truck structure itself, thus increasing the efficiency of the braking arrangement.

An object of my invention is to design a brake rigging for a four wheel freight car truck wherein the power means may be carried on one of the side frames in such a manner as to provide maximum clearance for the bolster of the car body which normally overlies the truck bolster.

My invention also contemplates a hand brake connection for a freight car brake arrangement of the unit cylinder type as above described.

A further object of my invention is to design a brake arrangement for a freight car truck wherein the power means is mounted on the side frame thereof and the side frame structure is so designed as to meet practical manufacturing problems as well as standard operating conditions.

Figure 4 is a side elevational view similar to that shown in Figure 2 except that the brake beam support means is of modified form; and Figure 5 is a fragmentary end elevation of the modification shown in Figure 4.

For the sake of clarity, certain parts are omitted from some of the above mentioned figures where they are better shown in others.

Figure 1:
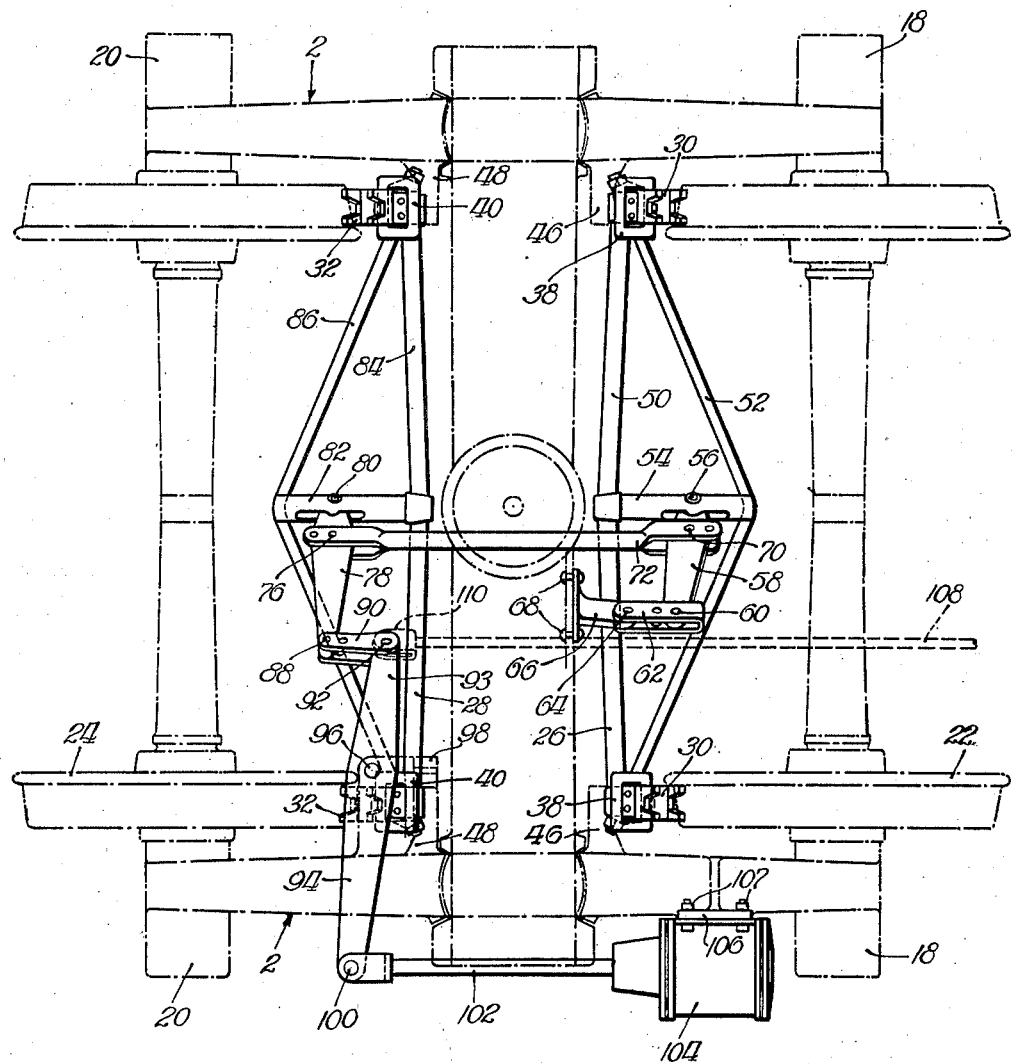
Figure 1 is a top plan view of a truck and brake structure embodying my invention.
Figure 2:
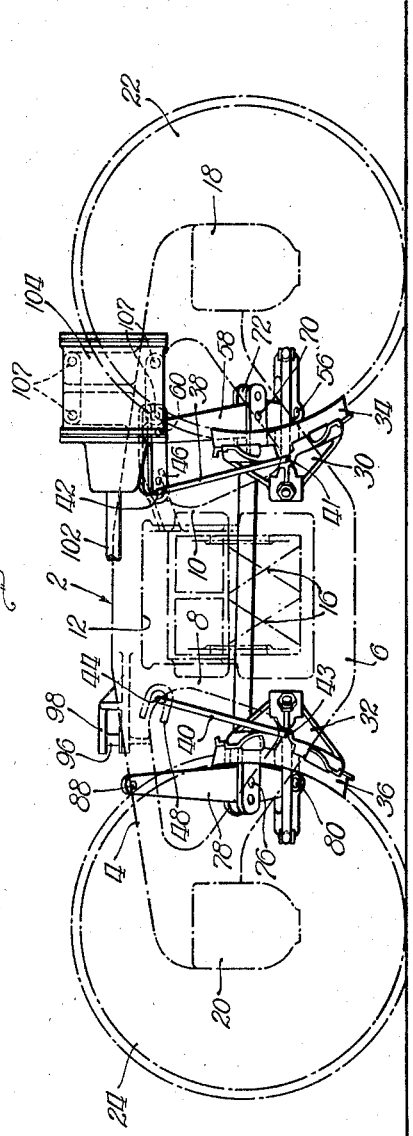
Figure 2 is a side elevation thereof.
Figure 3:
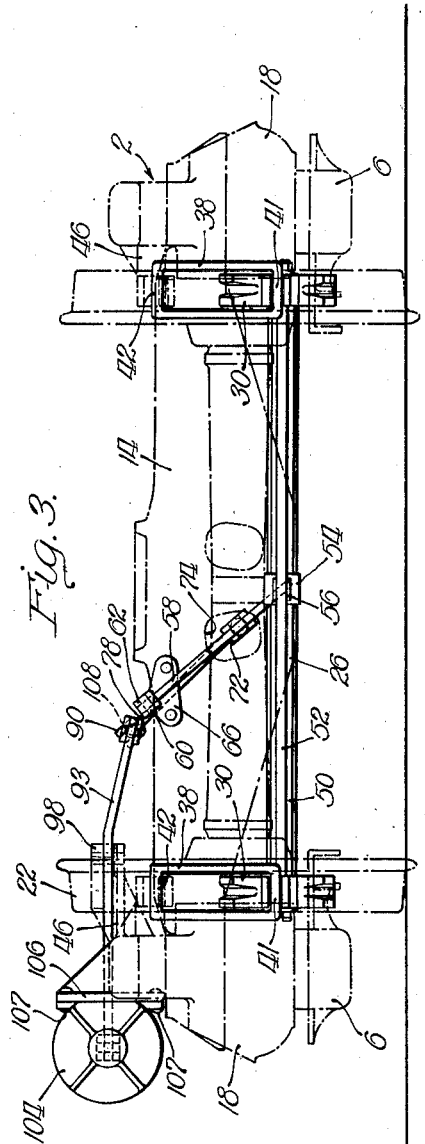
Figure 3 is an end view of the truck and brake structure shown in Figures 1 and 2.

Describing in more detail the truck and brake arrangement shown in Figures 1 to 3, the truck structure comprises the spaced side frames 2, 2 of truss type, each of said side frames including the compression member 4, the tension member 6 and spaced columns 8 and 10 forming therebetween the bolster opening 12 within which may be received the end of the bolster 14 which is seated upon the spring means diagrammatically indicated at 16 and cooperates with the columns 8 and 10 in a well known manner. The tension and compression members of the side frames merge adjacent their ends with the integrally formed journal boxes 18 and 20, said boxes forming the conventional means of connecting the frames to the supporting wheel and axle assemblies 22 and 24.

The brake rigging comprises the beams 26 and 28 carrying at their ends brake heads 30 and 32 with the brake shoes 34 and 36, support for said beams being provided in the form of hangers 38 and 40 pivotally connected to said heads at their lower ends as at 41 and 43 and pivotally hung at their upper ends as at 42 and 44 from the brackets 46 and 48 integrally formed on the inner faces of the side frames.

The beam 26 is of truss type having the compression member 50, the tension member 52 and the central strut or fulcrum 54, said fulcrum having centrally thereof a pivotal connection as at 56 with the lower end of the dead brake lever 58, the upper end thereof having a pivotal and adjustable connection as at 60 to the loop or strap 62, the open end of said strap having a pivotal connection as at 64 to the fulcrum 66 which may be integrally formed on the bolster or otherwise secured thereto as at 68. Intermediate the ends of the dead truck lever 58 is pivotally connected as at 70 one end of the compression bar 72, said bar extending through the opening 74 in the bolster walls and having at its opposite end a pivotal and adjustable connection as at 76 to the live truck lever 78, the lower end of which has a pivotal connection as at 80 to the strut or fulcrum 82 of the beam 28 which is likewise of truss form with the compression member 84 and the tension member 86. The upper end of the live truck lever 78 has a pivotal and adjustable connection as at 88 to the link 90 whose opposite end is pivotally connected as at 92 to the diagonally arranged inner end 93 of the dead cylinder lever 94, said dead cylinder lever being fulcrumed as at 96 from the bracket 98 integrally formed on the inner face of the side frame adjacent the juncture of the compression member 4 and the column 8 and above the previously described brake hanger bracket 48. The outer end of said dead cylinder lever has a pivotal connection as at 100 to the end of the elongated piston 102 forming a part of the power means 104 which is secured as at 107 to the bracket 106 integrally formed on the top of the side frame 2.

It may be noted that the power means or brake cylinder 104 is mounted on one end of the side frame while the guide and fulcrum bracket 98 for the dead cylinder lever 94 is mounted at the opposite end of the side frame, thus providing a balanced arrangement and, at the same time, removing the cylinder from the central portion of the side frame and giving additional clearance for the bolster of the car body which normally overlies the truck bolster.

A hand brake connection is conveniently arranged in the form of a pull rod or other member 108 having the jaw end 110 connected at the pivot point 92 as best seen in Figure 1.

In the modification shown in Figures 4 and 5, the form of the truck and the manner of mounting the power means thereon is identical with that described in Figures 1 to 3, and the brake arrangement likewise is similar except for the form of the brake beams and the manner in which they are supported from the side frames. The side frame 112 has the usual integral journal boxes 114, 114 providing a means of connection to the spaced wheel and axle assemblies 116, 116, said frame being of truss type and having the central opening 118 accommodating the end of the bolster 120. Power means 122 is mounted on the bracket 124 adjacent one end of the side frame in such manner as to clear the bolster of the car body which is supported upon the truck bolster 120. The piston 126 of the power means is elongated to extend beyond the end of the bolster 120 toward the opposite end of the frame where it is connected as at 128 to the outer end of the dead cylinder lever 130, said cylinder lever 130 being fulcrumed as at 132 in the bracket 134. The inner end of the cylinder lever 130 is bent downwardly as at 136 as in the embodiment previously described in order to facilitate clearances and provide a convenient link connection as at 138 to the upper end of the live truck lever 140, the lower end of which has a pivotal connection as at 142 in the fulcrum of the truss beam 144, said beam carrying on its ends brake heads 145 supporting brake shoes 147 for engagement with the peripheries of the adjacent wheels. Intermediate the ends of the live truck lever 140 is pivotally and adjustably connected as at 146 one end of the compression bar 148, the opposite end thereof having a pivotal and adjustable connection as at 150 to the dead truck lever 152, the upper end of said dead truck lever having a pivotal and adjustable connection as at 154 to link 156 which is fulcrumed as at 158 from the bracket 160 on the side of the bolster. The lower end of the dead truck lever 152 has a pivotal connection as at 162 to the central fulcrum of the truss beam 164, the ends of said beam carrying the brake heads 166 supporting brake shoes 168 for engagement with the adjacent wheels.

In this modification the brake beams are supported from the side frames in a different manner. The compression member of the beam is extended through the brake head to form a tongue-like member or guide means 170 (Figure 5) of rectangular section, said guide member 170 extending into the diagonally arranged groove or slot 172 formed between the top and bottom parallel walls 174 and 176. The said walls 174 and 176 project from the inner face of the side frame and are formed thereon at the junctures of the columns with the tension member. The member 170 is slidable in the groove thus formed and the lower wall 176 thus provides a means of support for the beam, said wall being reinforced by the substantially vertical reinforcing flange 178.

The operation of this brake mechanism is substantially identical to that hereafter described except for the fact that the beams are slidably guided by the tongue-like members 170 which are received in the grooves or slots 172. The diagonally arranged slots 172 are open toward the ends of the frame in order that the beams may be inserted or removed therefrom and the said slots are diagonally arranged in order that the force of gravity may operate to urge the beams away from the wheels when the brakes are not applied.

In operation, assuming the brakes to be in released position, actuation of the power means 104 causes the elongated piston 102 to move to the left (Figure 1), thus rotating the dead cylinder lever 94 in a clockwise direction about the pivot 96 intermediate its ends, and through the link 90 applying counter-clockwise rotation to the live truck lever 78 about the pivot 76 intermediate its ends until the brake shoes carried on the beam 28 are brought into engagement with the peripheries of the adjacent wheels. Continued actuation of the power means causes the live truck lever 78 to rotate in a clockwise direction about the fulcrum point 80 at its lower end, thus moving to the right the compression rod 72 and causing rotation of the dead truck lever 58 about the fulcrum point 60 at its upper end until the brake shoes 34 on the beam 26 are brought into engagement with the peripheries of the wheels at the opposite sides of the truck. Release of the power means causes the parts to move in reverse directions thus releasing the brakes.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

I claim:

1. In a four wheel railway truck, a truss side frame having a bolster opening, a spring group seated in said opening, a bolster end extending through said opening and seated on said spring group, spaced wheel and axle assemblies, power means mounted on said frame outwardly thereof at one side of said opening, fulcrum means on said frame inwardly thereof at the opposite side of said opening, a cylinder lever pivoted in said fulcrum means and having its outer end connected to the piston of said power means, said piston extending over said bolster end and having clearance from said opening and from said bolster end, and brake rigging comprising truss beams intermediate the wheels, said beams having center struts, live and dead truck levers connected respectively to said struts, a compression rod interconnecting said truck levers, said dead truck lever being fulcrumed from said bolster and said live truck lever having a connection to said cylinder lever, and hand brake means connected to said cylinder lever.

2. In a four wheel truck, a truss side frame having a bolster opening, a spring group seated therein, a bolster end extending through said opening and seated on said spring group and having vertical movement in said opening with relation to said side frame, spaced wheel and axle assemblies, braking means for said wheels, power means and fulcrum means on said side frame, a cylinder lever pivoted in said fulcrum means and connected at one end to the piston rod of said power means, said piston rod extending over said bolster and past said opening and having clearance to permit said vertical movement of said bolster end, and an operative connection between the other end of said cylinder lever and said braking means, said braking means comprising brake beams supported intermediate the wheels, center struts on said beams, live and dead truck levers having their lower ends connected to said struts respectively and connected intermediate their ends to each other, said dead lever being fulcrumed at its upper end from said bolster and said live truck lever having its upper end connected to said cylinder lever.

3. In a four wheel railway truck, a truss side frame having a bolster opening, a bolster end extending through said opening and resiliently supported for vertical movement therein, wheel and axle assemblies, power means mounted on said frame at one side of said opening, a cylinder lever fulcrumed on said frame at the opposite side of said opening, an elongated piston rod extending past said opening and connecting said power means with said cylinder lever, said piston rod being supported above said bolster end and having clearance therefrom at the maximum of said vertical movement, and brake rigging comprising truss beams with center struts intermediate the wheels, live and dead truck levers connected respectively to said struts, and a compression rod extending through said bolster and connecting said truck levers intermediate their ends, said dead truck lever being fulcrumed from said bolster and said live truck lever having its upper end connected to said cylinder lever.

4. In a four wheel railway freight car truck, truss side frames having bolster openings, a bolster connecting said frames and resiliently supported in said opening with its ends extending therethrough, wheel and axle assemblies, power means on one of said frames, said power means including a piston extending above said bolster, and brake rigging comprising truss beams supported from said frames and having central struts, live and dead truck levers having their lower ends connected to said struts respectively and connected intermediate their ends by a compression bar, said dead lever being fulcrumed from said bolster, and a cylinder lever fulcrumed on one of said frames and having its inner end connected to said live truck lever and its outer end connected to said piston, said piston extending past said opening and having clearance from said resiliently supported bolster.

5. In a four wheel railway truck, a truss side frame having a bolster opening, a bolster extending therethrough and resiliently supported for vertical movement therein, spaced wheel and axle assemblies, power means mounted on said frame outwardly thereof at one side of said opening, said power means having a piston extending over the end of said bolster past said opening and affording clearance for the movement of said bolster therein, fulcrum means and connected at one end to said thereof at the opposite side of said opening, a cylinder lever pivoted in said fulcrum means, said piston being connected to said cylinder lever and affording maximum clearance above said bolster, brake rigging comprising beams supported intermediate the wheels, and an operative connection between said cylinder lever and said rigging.

6. In a four wheel truck, a truss side frame having a bolster opening, a spring group in said opening, a bolster extending through said opening and supported on said spring group for vertical movement therein, spaced wheel and axle assemblies, braking means for said wheels, power means and fulcrum means on said frame, said power means having a piston, a cylinder lever pivoted in said fulcrum means and connected at one end to said piston, said piston extending over said bolster and having clearance therefrom during said vertical movement, and an operative connection between the other end of said cylinder lever and said braking means, said braking means comprising beams supported intermediate the wheels and having central struts, live and dead truck levers connected respectively to said struts and connected intermediate their ends, and a connection between said live truck lever and said cylinder lever.

7. In a four wheel truck, a truss side frame having a bolster opening, a bolster end extending through said opening and resiliently supported for vertical movement therein, spaced wheel and axle assemblies, braking means for said wheels, power means and fulcrum means on said frame, a piston in said power means, a cylinder lever pivoted in said fulcrum means and connected at one end to said piston, said piston extending over said bolster end and having clearance therefrom for said vertical movement, and an operative connection between the other end of said cylinder lever and said braking means, said braking means comprising beams supported intermediate the wheels, live and dead truck levers connected to said beams and connected to each other, an operative connection between said live truck lever and said cylinder lever, and hand brake means connected to said cylinder lever.

8. In a four wheel truck, a truss side frame having a bolster opening, a bolster end extending through said opening and resiliently supported for vertical movement therein, spaced wheel and axle assemblies, braking means for said wheels, power means and fulcrum means on said frame, said power means having a piston extending past said opening above said bolster and having clearance thereover to permit said vertical movement, a cylinder lever pivoted in said fulcrum means and connected at one end to said piston, and an operative connection between the other end of said cylinder lever and said braking means.

9. In a four wheel car truck, spaced side frames having bolster openings, a bolster having its ends extending through said openings and resiliently supported for vertical movement therein, wheel and axle assemblies, brake rigging for said assemblies, power means and fulcrum means on one of said frames, said power means having a piston extending past the adjacent opening above the adjacent bolster end and having clearance therefrom in said vertical movement, and a cylinder lever mounted in said fulcrum means and operatively connected to said piston and other brake rigging for said truck.

10. In a four wheel railway truck, spaced side frames having bolster openings, a bolster having its ends extending through said openings and resiliently supported for vertical movement therein, wheel and axle assemblies, brake rigging for said assemblies, power means and fulcrum means on one of said frames, said power means having a piston extending past the adjacent opening above the adjacent bolster end and having clearance from the adjacent bolster end in said vertical movement, and a cylinder lever mounted in said fulcrum means and operatively connected to said piston and to the brake rigging for said truck, said brake rigging comprising brake beams having ends slidably supported from said frames.

WALTER H. BASELT.

CERTIFICATE OF CORRECTION.

Patent No. 2,226,507. December 24, 1940.

WALTER H. BASELT.

It is hereby certified that error appears in the printed specification of the above numbered patent requiring correction as follows: Page 1, first column, line 18, for "meeing" read --meeting--; page 3, first column, line 55, claim 5, for the words "and connected at one end to said" read --mounted on said frame inwardly--; and that the said Letters Patent should be read with this correction therein that the same may conform to the record of the case in the Patent Office.

Signed and sealed this 21st day of October, A. D. 1941.

(Seal)

Henry Van Arsdale,
Acting Commissioner of Patents.